United States Patent Office 3,544,613
Patented Dec. 1, 1970

3,544,613
ALCOHOL SULFATION
Edward A. Knaggs, Deerfield, and Marvin L. Nussbaum, Skokie, Ill., assignors to Stepan Chemical Company, Northfield, Ill., a corporation of Delaware
No Drawing. Continuation-in-part of application Ser. No. 354,634, Mar. 25, 1964. This application Aug. 9, 1965, Ser. No. 478,081
The portion of the term of the patent subsequent to Feb. 9, 1982, has been disclaimed
Int. Cl. C07c *141/04*
U.S. Cl. 260—458           3 Claims

ABSTRACT OF THE DISCLOSURE

The instant invention relates to an improvement in a known continuous process for sulfating certain fatty alcoholic compounds, under continuous process conditions which involve a relatively short-time contact of the alcoholic material with gaseous $SO_3$ as well as a relatively short time in which the sulfated alcoholic compound is subjected to elevated temperatures. The improvement in this process results in a sequence of treatment of the continuously sulfated alcoholic material, by quenching the same immediately after the material has been sulfated and neutralizing the sulfated material, and finally bleaching the product with hydrogen peroxide, all under certain specified conditions.

---

This is a continuation-in-part of copending application Ser. No. 354,634, filed Mar. 25, 1964, now abandoned, which, in turn, was copending with application Ser. No. 31,707, filed May 25, 1960 and now U.S. Pat. No. 3,169,142.

The instant invention is concerned with the problem of obtaining superior light color in certain materials of the type that may be sulfated or sulfonated and which may be described more generally as materials containing groups susceptible of receiving the $SO_3$ group. The reaction is often referred to merely as "sulfonation," although a distinction is sometimes recognized in the art between sulfonation and sulfation. In the practice of the instant invention the material treated with $SO_3$ is a so-called fatty alcohol, which is an organic compound having the characteristic alcoholic group either as a simple OH or as a mono or polyethoxylated OH group, in each case connected by chemical bonds to a long chain aliphatic hydrocarbon group, generally referred to as having from 8 to 20 carbon atoms in the long chain aliphatic group. Preferably this is a straight chain group which may be referred to as a $C_8$–$C_{20}$ alkyl group.

In our aforesaid patent it is pointed out that there are distinct advantages in the continuous sulfonation of alcoholic compounds of the type just mentioned; and our previously mentioned disclosures are incorporated herein by reference. To be more specific, the instant invention may be described as a process that comprises (A) continuously effecting a sulfation reaction between sulfur trioxide and a liquid fatty alcohol organic compound having a long chain aliphatic hydrocarbon group by forming a liquid film of the organic compound on a supporting and confining heat-exchange surface defining a reaction zone, forming in predetermined concentration a pressurized diluted reactant gaseous mixture of an inert gas and gaseous reactant sulfur trioxide containing a given proportion within the range of 5:1 to 50:1 inert gas to sulfur trioxide by volume, introducing said gaseous mixture into the confining reaction zone formed by the heat-exchange surface and impinging said gaseous mixture against said liquid film at a high velocity to induce marked turbulence therein and effect an exothermic reaction involving the aforesaid reaction, and removing at least a portion of the exothermic heat of reaction by heat-transfer through the heat-exchange surface while maintaining the film viscosity sufficiently low to permit said impinging gas to effect said marked turbulence, said liquid film being subjected to the aforesaid pressurized gaseous mixture within substantially 0.5 second; and (B) immediately after step (A) quenching the organic liquid acid reaction product to a temperature of not more than substantially 50° C. with a substantial excess of cooling fluid, neutralizing the acid and bleaching such product with substantially 0.2 to 0.15% of hydrogen peroxide to effect at least substantially 10% improvement in light transmission of such product.

The instant invention may be demonstrated specifically by using the continuous sulfonation conditions and equipment described in our aforesaid patent for purposes of continuous sulfonation as follows:

The reaction vessel used for continuous sulfonation is that described in our aforesaid patent, consisting essentially of a generally vertical reactor, six feet in length, with the top four feet of the reactor jacketed with a first jacket and the bottom two feet jacketed with a second temperature control jacket. The reactor wall thickness is 0.035 inch and the reactor diameter is 0.43 inch. At the top of the reactor the gas jet diameter for gas entry is 0.15 inch and the oil depth diameter for the liquid fatty alcohol entry is 0.012 inch. Using $SO_3$ diluted in nitrogen to a ratio of 5 to 95 volumes, the procedure employed is as follows:

Lauryl alcohol with 2–3 or an average of 2½ mols ethylene oxide addition was sulfated in the following manner. Water at a temperature of 90° F. was circulated through the reactor jacket, while the nitrogen gas flow was started through the gas jet. This rate amounted to about 85,900 cc. of nitrogen gas per minute per tube at a pressure of 3¼ p.s.i. Alcohol flow was initiated at a pressure of about 12 p.s.i. and at a temperature of about 30° C., producing a flow rate of 58 grams per minute, equivalent to 2.0 pounds of sulfur trioxide per hour per tube. The liquid sulfur trioxide at a pressure of about 18 pounds was then started into the flash vaporizer which had been heated to 100° C. This brought the nitrogen gas flow rate down to 83,500 cc./min. and raised the line pressure to 4⅓ pounds. The temperature of the emerging mixture of ethoxylated lauryl sulfuric acid and gases was 50°. The acid was collected in a jar and held for ten minutes before pouring it slowly into a mixture of 50% sodium hydroxide and water. The salt was then bleached with 0.15% hydrogen peroxide, and the product obtained increased in transmittance at 435 millimicrons from 76.5% to 93.5%.

In this same experimental work, dry air was substuted for nitrogen gas at an initial flow rate of about 78,800 cc. air/min. at 2¾ p.s.i. pressure. The operating flow dropped to 72,000 cc. air/min. at 3¼ p.s.i., and the transmittance of the salt increased from 51 to 92% after bleaching with 0.2% hydrogen peroxide. In these experiments the nitrogen gas-sulfur trioxide ratio was 95.7:4.3, while the air-sulfur trioxide ratio was 95:5.

It will be appreciated that comparable results are obtained by substituting for the ethoxylated lauryl alcohol in the foregoing demonstration pentaethoxylated stearyl alcohol, decaethoxylated stearyl alcohol, pentaethoxylated palmityl alcohol, palmityl alcohol, lauryl alcohol, etc. Essentially, the alcohol used is liquefied so that it will flow in the desired film in the reactor and this may require nominal changes in the initial temperature of the reaction tube on which the film is formed and/or various combinations of alcohols which have a depressed melting point. In general, the starting material used is an alcohol selected from the group consisting of $C_8$–$C_{20}$ alkanol and $C_8$–$C_{20}$ alkanol alkoxylated with 1 to 40 mols of ethylene oxide and/or propylene oxide.

The $SO_3$ employed in the practice of the instant invention is diluted to a predetermined concentration in a pressurized gaseous mixture with an inert gas such as air, nitrogen, etc. in volume proportions of 5:1 to 50:1 for the inert gas to sulfur trioxide. The pressurized diluted gaseous mixture impinges and/or is brought rapidly into contact with the alcoholic film so as to cause the desired turbulence to assist in the heat exchange function of the walls of the reactor and also to effect substantially instantaneous sulfation reaction. The sulfation reaction is initiated within substantially 0.5 second, and ordinarily such reaction is initiated within substantially 0.1 to 0.2 second. In fact, by the use of the controlled conditions described in the previous demonstration, the entire reaction may be completed in this length of time; but in any event the reaction is initiated in this period of time, which for practical purposes constitutes a substantially instantaneous reaction.

After the reaction in the tubular reactor is carried to substantial completion, or at least is completed to the extent that is practical within the relatively short period of time that the liquid and gas phases are present in the reactor, the sulfated material is cooled or quenched rapidly to substantially 50° C. The quenching or cooling function is intended to minimize discoloration which tends to increase with prolonged heating of the material that has been sulfated as well as the material that is still being sulfated. Of course, a certain amount of $SO_3$ dissolves in the liquid film while some of the molecules are reacting with the alcohol and after the quenching procedure the material is preferably allowed to stand for a brief period of time, as indicated in the previous demonstration.

In holding the liquid product at substantially 50° C. after it has been forced out of the reaction tube, one inherently carries out a process known as "digestion," in which the dissolved $SO_3$ tends to continue to react with unsulfated material in the liquid and the amount of unsulfated material in the liquid is accordingly decreased (with corresponding increase in the overall yield of sulfated material). Preferably such digestion is carried out at a temperature of substantially 50° C., and at least at a temperature not in excess of about 67° C.

After the digestion procedure, which may involve only a few minutes (e.g. as little as 10 minutes) up to an hour or two, the resulting acid, i.e., sulfated alcohol, is neutralized. Neutralization is preferably carried out in conventional manner using dilute sodium hydroxide, for example, in water and using relatively carefully controlled conditions so as to minimize hot spots and/or excessive general elevation of temperature in the reaction mixture being neutralized.

After neutralization the resulting product is found to have fairly good color, but the instant invention results in a distinct improvement in this respect in that it provides for the bleaching of the resulting product with hydrogen peroxide, in order to effect at least substantially 10% improvement in light transmission of the sulfated product. The amount of bleach employed may vary in order to obtain the desired improvement in light transmission, but commercially available 50% aqueous hydrogen peroxide is sufficiently expensive to involve a cost consideration in commercial embodiments of the invention, so the amount of bleach used is maintained at a minimum that is effective for obtaining the desired improvement in color. Thus, the amount of hydrogen peroxide bleach used is preferably substantially 0.2 to 0.15% of the "active" or neutralized acid material being bleached in the reaction mixture.

It will thus be seen that the essential conditions of continuous sulfation are those already described in considerable detail in our U.S. Pat. No. 3,169,142 incorporated herein by reference. In addition, the sulfated alcoholic product that is being bleached in the practice of the instant invention is neutralized first in order to stabilize the same and then bleached using preferably the minimum amount of hydrogen peroxide bleach which will result in the desired improvement in color. The selection of the amount of hydrogen peroxide bleach thus is dependent upon cost factors and the desired amount of color improvement.

It will be understood that modifications and variations may be effected without departing from the spirit and scope of the novel concepts of the present invention.

We claim as our invention:

1. A process that comprises (A) continuously effecting a sulfation reaction between sulfur trioxide and a $C_8$–$C_{20}$ alkanol and $C_8$–$C_{20}$ alkanol alkoxylated with 1 to 40 mols of at least one member of the group consisting of ethylene oxide and propylene oxide by forming a liquid film of the organic compound on a supporting and confining heat-exchange surface defining a reaction zone, forming a pressurized diluted reactant gaseous mixture of an inert gas and gaseous reactant sulfur trioxide containing a given proportion within the range of 5:1 to 50:1 inert gas to sulfur trioxide by volume, introducing said gaseous mixture into the confining reaction zone formed by the heat-exchange surface and impinging said gaseous mixture against said liquid film at a high velocity to induce marked turbulence therein and effect an exothermic reaction involving the aforesaid reaction, and removing at least a portion of the exothermic heat of reaction by heat-transfer through the heat-exchange surface while maintaining the film viscosity sufficiently low to permit said impinging gas to effect said marked turbulence, said liquid film being subjected to the aforesaid pressurized gaseous mixture within substantially 0.5 second; and (B) immediately after step (A) quenching the organic liquid acid reaction product to a temperature of not more than substantially 50° C. with a substantial excess of cooling fluid, neutralizing the acid and bleaching such product with substantially 0.2 to 0.15% of hydrogen peroxide to effect at least substantially 10% improvement in light transmission of such product.

2. A process as defined in claim 1 wherein the alcohol is an ethoxylated fatty alcohol.

3. A process as defined in claim 2 wherein the alcohol is ethoxylated lauryl alcohol.

References Cited

UNITED STATES PATENTS

| | | | |
|---|---|---|---|
| 2,758,977 | 8/1956 | Knowles et al. | 252—153 |
| 2,923,728 | 2/1960 | Falk et al. | 260—459 |
| 3,169,142 | 2/1965 | Knaggs et al. | 260—457 |
| 3,200,140 | 8/1965 | Sowerby | 260—459 |

LEON ZITVER, Primary Examiner

L. DeCRESCENTE, Assistant Examiner

U.S. C. X.R.

260—459